(12) United States Patent
Defontis

(10) Patent No.: US 11,736,376 B2
(45) Date of Patent: *Aug. 22, 2023

(54) INTERNET BROWSING MONITORING SYSTEM

(71) Applicant: SCALEFAST INC., Wilmington, DE (US)

(72) Inventor: Florent Defontis, Tokyo (JP)

(73) Assignee: SCALEFAST INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/895,231

(22) Filed: Aug. 25, 2022

(65) Prior Publication Data

US 2023/0138676 A1 May 4, 2023

Related U.S. Application Data

(63) Continuation of application No. 17/521,940, filed on Nov. 9, 2021, now Pat. No. 11,451,461.

(30) Foreign Application Priority Data

Nov. 2, 2021 (FR) ...................................... 2111635

(51) Int. Cl.
| | |
|---|---|
| *H04L 43/10* | (2022.01) |
| *G06F 16/958* | (2019.01) |
| *G06F 16/22* | (2019.01) |
| *G06F 16/953* | (2019.01) |
| *H04L 67/02* | (2022.01) |

(52) U.S. Cl.
CPC .......... *H04L 43/10* (2013.01); *G06F 16/2282* (2019.01); *G06F 16/953* (2019.01); *G06F 16/986* (2019.01); *H04L 67/02* (2013.01)

(58) Field of Classification Search
None
See application file for complete search history.

(56) References Cited

U.S. PATENT DOCUMENTS

| | | | |
|---|---|---|---|
| 8,639,560 B2 * | 1/2014 | Kandogan | .......... G06Q 30/0201 705/7.29 |
| 10,769,426 B2 | 9/2020 | Guo et al. | |
| 2011/0191676 A1 | 8/2011 | Guttman et al. | |

(Continued)

*Primary Examiner* — Quang N Nguyen
(74) *Attorney, Agent, or Firm* — Troutman Pepper Hamilton Sanders LLP

(57) ABSTRACT

An Internet browsing monitoring system has a web server providing a web page in which some of the elements associated with the browsing monitoring are encoded in the web page by a CSS code, the web page includes a mechanism detecting interactions to be logged, and, when a type of interaction to be logged is detected, sends the CSS code associated with the considered element with at least one indicator of the detected interaction to an interaction logging server. The interaction logging server has an input memory receiving the CSS codes associated with a considered element and the at least one indicator of the detected interaction and an extractor analyzing each CSS code associated with a considered element and the at least one indicator of the detected interaction, split them into chunks, encode at least some of the chunks in the form of a number, and store the resulting sequence of numbers encoding the chunks in a database.

17 Claims, 1 Drawing Sheet

(56) References Cited

U.S. PATENT DOCUMENTS

| | | | |
|---|---|---|---|
| 2012/0311040 A1* | 12/2012 | Sherzer | G06F 16/954 709/204 |
| 2013/0031470 A1 | 1/2013 | Daly, Jr. et al. | |
| 2013/0055068 A1* | 2/2013 | Mahmud | G06F 16/986 715/234 |
| 2013/0268516 A1 | 10/2013 | Chaudhri et al. | |
| 2018/0013840 A1 | 1/2018 | Mitevski | |
| 2020/0133982 A1 | 4/2020 | Thangeswaran et al. | |
| 2022/0094736 A1* | 3/2022 | Duncan | G06F 9/542 |

* cited by examiner

United States Patent

INTERNET BROWSING MONITORING SYSTEM

CROSS REFERENCE TO RELATED APPLICATION

The present application is a continuation of U.S. patent application Ser. No. 17/521,940 filed Nov. 9, 2021, which claims priority of French Patent Application No. 2111635 filed Nov. 2, 2021. The entire contents of which are hereby incorporated by reference.

FIELD OF INVENTION

The invention relates to Internet browsing monitoring, and in particular monitoring of browsing or activity within a site and within the pages of a site.

BACKGROUND

Website designers have access to a limited amount of data enabling them to quantify the quality of the sites they design. Historically, their main information source has been the audience measurement, through page counting.

To enrich these data, some solutions have been developed in order to try to systematize the retrieval of most operations of a user within a site, including within a page.

However, these solutions pose several problems. First of all, the solution should not generate an overload on the server side. Indeed, monitoring all of the interactions of a user with a page is a task that generates a considerable amount of data which might pose major problems in terms of network and server load.

To overcome this problem, it is known to reference the objects of a web page by its order of occurrence in the code. Afterwards, the browsing monitoring data are reported based on this order. The problem of these solutions is that in the absence of a specific tagging, as soon as the structure of the page is lost, all past data lose their relevance. Hence, the cost is passed on to the maintenance of the web pages and the design thereof.

SUMMARY

The invention aims to improve the situation. To this end, it proposes an Internet browsing monitoring system comprising a web server arranged to provide at least one web page in which at least some of the elements associated with the browsing monitoring are encoded in the web page by a CSS code, the web page comprising a mechanism for detecting interactions to be logged, which mechanism is arranged, when a type of interaction to be logged is detected, to send the CSS code associated with the considered element with an indicator of the detected interaction to an interaction logging server. The interaction logging server comprises an input memory arranged to receive the CSS codes associated with a considered element and at least one indicator of the detected interaction, and an extractor arranged to analyze each CSS code associated with a considered element and the at least one indicator of the detected interaction, split them into chunks, encode at least some of the chunks in the form of a number, and store the resulting sequence of numbers encoding the chunks in a database.

This device is particularly advantageous as it makes it possible to provide a system that does not require any modification of the code of the web page, that systematizes the browsing monitoring on all elements, and that enables a real-time analysis of the data without any additional cost as the database is structured with the data of the code of the web page, which are therefore mastered upon the design of the latter.

According to various embodiments, the invention may have one or more of the following features:

- the logging server comprises a content delivery network server, and wherein the input memory is a logging memory of the content delivery network server,
- the extractor is an extraction, transformation and loading tool,
- the extractor is further arranged to store the sequence of numbers encoding the chunks composing the CSS code associated with the considered element with an indicator of the detected interaction in a row of a table of the database, each number being stored in a distinct column,
- the extractor is further arranged to store the pairs associating a chunk with a number in a two-column table of the database,
- the extractor is arranged to search for a chunk in a two-column table of the database to retrieve the corresponding number, and, when the chunk is absent, to generate a number and create a new row with the chunk and the generated number,
- the detection mechanism is implemented by a JavaScript code included in the web page,
- the detection mechanism emits a content query to the content delivery network server, which content has a weight smaller than 1 kb, and wherein said query contains as parameters at least the URL of the web page on which the interaction has been detected, the CSS code of the considered element and an indicator of the detected interaction,
- the detection mechanism is arranged to detect an interaction in the group comprising the display of a page, the simple-click, the double-click, the long press, the quick touch and the long touch, and
- the mechanism comprises an enriching function arranged to detect that the interaction type of a detected interaction is such that two interactions each having a selected interaction type have been detected on the same web page without changing the page, to compute a duration from time markers associated with these two interactions, and to return this duration with the CSS code associated with the considered element with an indicator of the second detected interaction.

BRIEF DESCRIPTION OF DRAWINGS

Other features and advantages of the invention will appear better upon reading the following description, derived from examples provided for illustrative and non-limiting purposes, derived from the drawings wherein.

DETAILED DESCRIPTION

The drawings and the description hereinafter essentially contain elements that are certain. Hence, not only can they serve to better understand the present invention, but they also contribute to the definition thereof, where appropriate.

Figure 1:
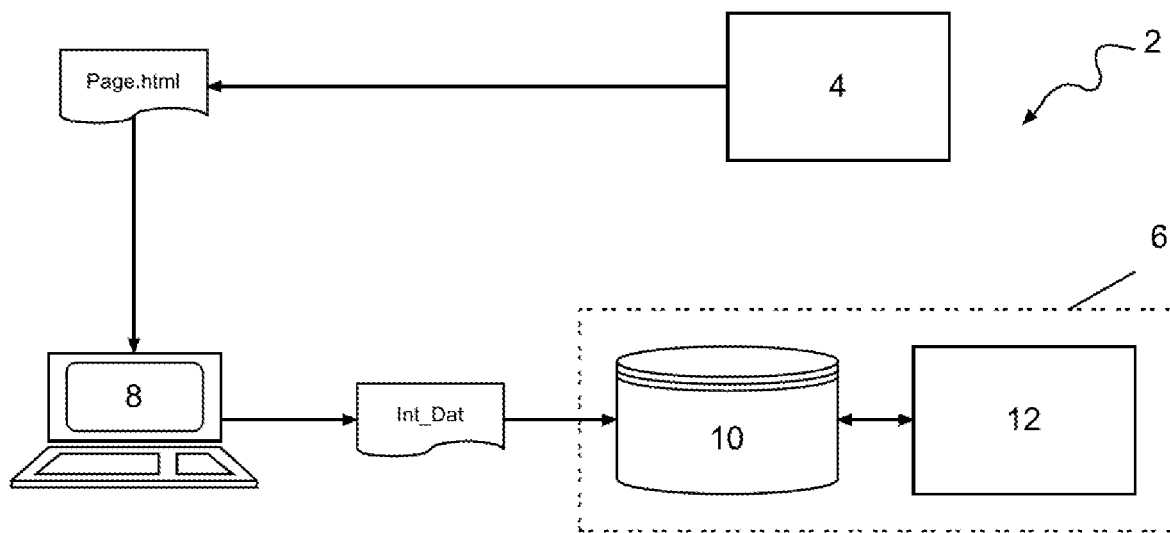
FIG. 1 represents a generic diagram of an Internet browsing monitoring system according to the invention.

FIG. 1 represents a generic diagram of an Internet browsing monitoring system 2 according to the invention. In the example described here, the customized Internet browsing monitoring system 2 comprises a web server 4 and a logging server 6. The web server 4 is arranged to provide web contents, in particular web pages to one or more devices 8 that are connected to the Internet.

The logging server 6 comprises a memory 10 and an extractor 12. In the example described here, the memory 10 comprises an input memory and a logging database which will be described hereinbelow. Still in the example described here, the logging server 6 is a content delivery network server (or CDN server), and the extractor 12 is an extraction, transformation and loading tool ("ETL tool"). As it will be seen hereinbelow, the role of the ETL tool is to transform the browsing monitoring data received by the CDN server to record them in the logging database which is a relational database. In the example described here, this database is stored in the same space as the input memory. Alternatively, the browsing data may be stored in distinct spaces. In the example described here, the ETL tool is part of the CDN server. Alternatively, the ETL tool could be implemented in another server or computing resource.

The memory 10 may consist of any type of data storage that could receive digital data: hard disk, flash memory hard disk, flash memory in any form, random-area memory, magnetic disk, storage distributed locally or on the cloud, etc. The data computed by the device may be stored on any type of memory similar to the memory 4, or on the latter. These data may be deleted once the device has performed its tasks or be kept. In one example the memory is non-transient.

The extractor 12 accesses the input memory directly or indirectly. It may be made in the form of an adequate computer code executed on one or more processors. By processor, it should be understood any processor suited for the computations described hereinbelow. Such a processor may be made in any known manner, in the form of a microprocessor for a personal computer, a FPGA- or SoC-type dedicated chip, a computing resource on a grid or in the cloud, a cluster of graphical processors (GPUs), a microcontroller, or any other form capable of providing the computing power necessary for the task described hereinbelow. One or more of these elements may also be made in the form of special-purpose electronic circuits such as an ASIC. A combination of processor and electronic circuits may also be considered.

The operation of the browsing monitoring is as follows. A device 8 sends a query to the web server 4 to consult a web page Page.html. In this web page, the elements to be displayed are encoded with CSS code to form it. Besides the CSS codes, the web page Page.html contains a Javascript code that implements a mechanism for detecting interactions to be logged. This mechanism is arranged to detect that a user interacts with an element of the web page and that this interaction should be logged. For example, this interaction could be the display of the page ("Pageview" event), a click on an element (simple-click, long click, double-click, long press, quick touch, long touch, etc . . . ), a scroll over an event ("Mouseover" event), etc. The mechanism may be arranged to detect all possible interactions on the web page or only a subset of theses, depending on the desired logging degree.

When one of these interactions is detected, the JavaScript code triggers a silent query Int_Dat to the CDN server. The term silent query is used because this query targets a content that is not interesting for the device 8, and whose result should remain transparent for the latter. Thus, in the example described here, this query targets an image that contains a unique pixel (i.e. a 1 pixel* 1 pixel sized image) and whose display cannot be seen. Hence, the query Int_Dat contains the address of this resource on the CDN server, but also all of the data of interest for logging. For this purpose, these data are considered as parameters of the query. Advantageously, the resource on the logging server side will weigh (occupy) less than 1 kb, which makes it possible to preserve the bandwidth, and provide a resource that will not be perceived by the user even when it is displayed.

Hereinbelow, an example of the address targeted by the query on the CDN server is provided.

https://8vhgfgcwsnjp.air360tracker.net/
i?a=8vhgfgcwsnjp&d=dc4912ea8f9b966fa38
6081cbfe8e46e&s=648d8686-fa31-4d55-bd04-
075294e3155c-1632908375&
p=web&t=1632909753.266&et=pv&e1=Pageview&wu=
https%3A%2F%2Fbilletteri
e.fr%2F&wt=Billetterie&wr=https%3A%2F%2Fbilletterie.
fr%2Fcontent%2F168-billetterie-europa-league-21-
22&web_i=1

In this query, we have:
the address of the resource on the CDN server:
    8vhgfgcwsnjp.air360tracker.net/i?a=8vhgfgcwsnjp,
the user identifier: dc4912ea8f9b966fa386081cbfe8e46e,
the CSS code of the considered element: p=web
the session identifier: 648d8686-fa31-4d55-bd04-
    075294e3155c-1632908375,
the type of interaction and its time marker: Pageview;
    1632909753.266,
the URL of the initial web page:
    https %3A%2F%2Fbilletterie.fr%2F&wt=Billetterie
the URL of the web page to which the link that has been
    clicked on points:
    https%3A%2F%2Fbilletterie.fr%2Fcontent%2F168-bil-
    letterie-europa-league-21-22.

When received by the CDN server, this query is stored in a log that forms the input memory. It appears here that the use of a CDN server is particularly interesting. Indeed, it makes it possible to use the query logging function available in all CDN servers. In addition, these are intrinsically intended to manage very large access loads, which means that the system 2 could serve several thousands of users simultaneously.

Furthermore, the use of a transparent query implies, on the one hand, that the user is not affected by logging of his/her interactions, and, on the other hand, that the query URL is an ideal vector to transport the data to be logged. Finally, the use of the CSS code associated with the logged element is very advantageous as it allows for an easy identification of the elements by their CSS properties, without the need for any particular processing on the side of the user consulting the web page, or when designing the page.

Once this query is received in the input memory 10, the extractor 12 begins processing it to store the data in the logging database. In the example described here, this is carried out periodically, for example the extractor 12 accesses the input memory every minute. This desynchronization is interesting as it enables the system 2 to withstand considerable connection peaks without having to perform a scaling or risking a loss of service, while remaining a real-time one in most situations. Thus, the experiments of the Applicant have shown that with a conventional CDN server, the extractor 12 can unstack the input memory in 30 minutes even in case of peaks of several hundreds of thousands of connections per minute for ten minutes.

Figure 2:
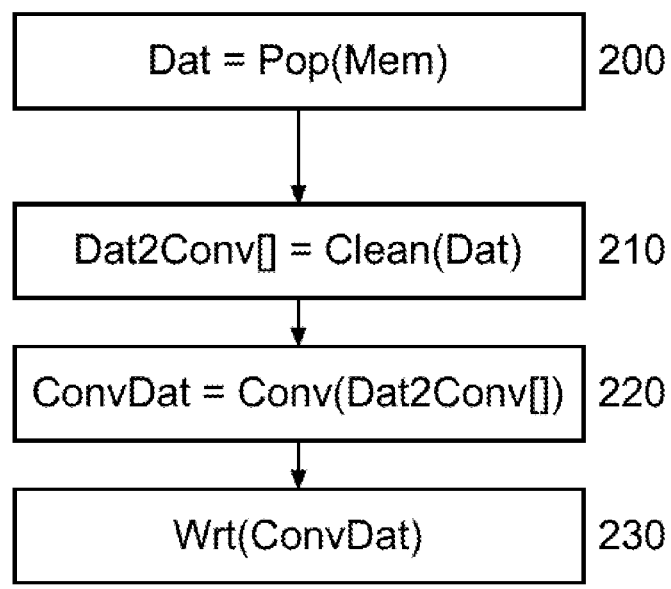
FIG. 2 represents an example of a function implemented by the extractor of FIG. 1.

FIG. 2 represents an example of operation of the extractor 12 for processing the data in the input memory 10.

In an operation 200, the extractor 12 retrieves an input from the input memory 10 through the execution of a function Pop( ) which unstacks the latter and stores the result in a local variable Dat.

Returning back to the above-mentioned example, the local variable Dat therefore contains the complete URL
https://8vhgfgcwsnjp.air360tracker.net/
i?a=8vhgfgcwsnjp&d=dc4912ea8f9b966fa38
6081cbfe8e46e&s=648d8686-fa31-4d55-bd04-
075294e3155c-1632908375&
p=web&t=1632909753.266&et=pv&e1=Pageview&wu=
https%3A%2F%2Fbilletteri
e.fr%2F&wt=Billetterie&wr=https%3A%2F%2Fbilletterie.
fr%2Fcontent%2F168-billetterie-europa-league-21-
22&web_i=1

Afterwards, in an operation 210, the extractor 12 clears the variable Dat by means of a function Clean( ) in particular to delete the URL of the resource on the CDN server and the data separators in the URL, and splits the result into chunks in the table Dat2Conv[].

From the URL hereinabove, the obtained table Dat2Conv[] is as follows:

| | |
|---|---|
| a | 8vhgfgcwsnjp |
| d | dc4912ea8f9b966fa386081cbfe8e46e |
| s | 648d8686-fa31-4d55-bd04-075294e3155c-1632908375 |
| p | web |
| t | 1632909753.266 |
| et | pv |
| el | Pageview |
| wu | https%3A%2F%2Fbilletterie.fr%2F |
| wt | Billetterie |
| wr | https%3A%2F%2Fbilletterie.fr%2Fcontent%2F168-billetterie-europaleague-21-22 |
| web_i | 1 |

Afterwards, the table Dat2Conv[] is browsed by means of a function Conv( ) to convert a given input into a unique number. This conversion is carried out by accessing a conversion table comprising two columns. One of the columns contains text strings, and the other one a number. The function Conv( ) searches for the text in the input of the table Dat2Conv[] and returns the corresponding number if this text is present. If the text is not present, then a pseudo-random generator is used to determine a number for this text, and this double entry is added to the two-column table. Finally, the numbers corresponding to the inputs of the table Dat2Conv[] are returned in a variable ConvDat in which the numbers are separated by a separator, for example ";" or "#".

According to a first variant, all of the inputs of the table Dat2Conv[] are transformed by the function Conv( ). According to a second variant, some unique elements such as the user identifier are not converted and will be stored identically in the relational database.

Finally, in an operation 230, a function Wrt( ) writes the variable ConvDat in a row of a table of the relational database.

This operation of the extractor 12 is particularly interesting because it is easy to implement by an ETL tool, and produces some kind of encoding of each silent query into a sequence of numbers. Yet, this data type is particularly easy to handle in extraction, and the searches are inexpensive in terms of computation cost.

Thus, it becomes possible to log all of the browsing events of an unlimited number of devices in a manner that could be industrialized, with real-time availability, and in a manner that makes the extraction of the data even easier as splitting into chunks of the operation 210 makes this particularly agile. Indeed, by designing the CSS inputs of the web pages in a well-thought-out way, it becomes possible not only to carry out the analysis on one web page, but also on an entire site. For this purpose, all it needs is to name elements that should be analyzed simultaneously in the same manner: the portion of these elements that corresponds to the name in the CSS code will be encoded with the same number, and all it needs is to search for this number to retrieve all of the events associated with these. In the same spirit, the combination of several numbers together will amount to a query on a subset of elements, etc.

Hence, it appears that, considered separately, each of the above-described features confers a considerable advantage in comparison with the prior art. Thus, it would be possible to use a server type other than a CDN server, or a tool other than an ETL tool, or to use a vehicle other than a transparent query to transmit the data to be encoded. The most critical elements are the use of the CSS code data, split into chunks and encoded into a sequence of numbers which makes it possible to obtain the main technical effect. The specificities targeted hereinabove make it possible to improve the obtained result even more.

It is also possible to enrich the operation of the system 2 even more by combining some events on the device side.

Indeed, when two events succeed one after another without any page change (for example, loading of the page, and then clicking on a particular element, which could cause a page change or reveal a particular interest of the user for one element), the mechanism could directly compute the time that has elapsed between the first interaction and the second one, and transmit this information in the transparent query. This makes it possible to create composite indicators without weighing down the server load, with an unperceivable cost on the client side.

Furthermore, the logging server may comprise routines that automatically compute some composite indicators in the database, such as the average time for the indices that have just been described, the average number of clicks per hour/day/other time unit on each element or on a subset of these, etc.

Thanks to the foregoing, the Internet browsing monitoring system 2 makes it possible to provide an enriched interface to the designers, who could access an enriched version of the web pages which makes it possible to display instantaneously for each element all relevant information in the relational database.

The invention claimed is:

1. An Internet browsing monitoring system comprising:
a web server configured to:
generate at least one web page in which at least some of the elements associated with the Internet browsing monitoring system are encoded in the at least one web page by a CSS code, the at least one web page comprising a detector configured to detect interactions to be logged when a type of interaction to be logged is detected; and
send the CSS code associated with the at least some of the elements with at least one indicator of the detected interaction to an interaction logging server;
the interaction logging server comprising:
an input memory configured to receive, from a web server, a content query comprising at least the URL of the at least one web page on which the interaction has been detected, CSS codes associated with a considered element and the at least one indicator of the detected interaction as parameters;
an extractor configured to:
split each CSS code from the content query into chunks;

encode at least some of the chunks in the form of a number; and store the resulting sequence of numbers encoding the chunks in a database, wherein the content query is less than 1 kb;

wherein the extractor is further configured to store the resulting sequence of numbers encoding the chunks composing the CSS codes associated with the considered element and the at least one indicator of the detected interaction in a row of a table of the database, each number being stored in a distinct column.

2. The Internet browsing monitoring system according to claim 1, wherein the extractor is an extraction, transformation and loading tool.

3. The Internet browsing monitoring system according to claim 1, wherein the extractor is further configured to store the pairs associating a chunk with a number in a two-column table of the database.

4. The Internet browsing monitoring system according to claim 3, wherein the extractor is configured to search for a chunk in the two-column table of the database to retrieve the corresponding number, and, when the chunk is absent, to generate a number and create a new row with the chunk and the generated number.

5. The Internet browsing monitoring system according to claim 1, wherein the detection mechanism is implemented by a JavaScript code included in the web page.

6. The Internet browsing monitoring system according to claim 1, wherein a detector is configured to detect an interaction in the group comprising a display of a page, a simple-click, a double-click, a long press, a quick touch and a long touch.

7. The Internet browsing monitoring system according to claim 1, wherein a detector comprises an enriching function detecting that the interaction type of a detected interaction is such that two interactions each having a selected interaction type have been detected on the same web page without changing the web page, computing a duration from time markers associated with these two interactions, and to returning this duration with the CSS code associated with the considered element with an indicator of the second detected interaction.

8. A system, comprising:
one or more processors; and
a memory in communication with the one or more processors and storing instructions that, when executed by the one or more processors, are configured to cause the system to:
receive, from a web server a content query comprising at least the URL of the web page on which the interaction has been detected, CSS codes associated with a considered element and at least one indicator of detected interaction as parameters;
split each CSS code into chunks;
encode at least some of the chunks in the form of a number; and
store the resulting sequence of numbers encoding the chunks in a database, wherein the content query is less than 1 kb in size;

wherein the system is further configured to store the resulting sequence of numbers encoding the chunks comprising the CSS codes associated with the considered element and the at least one indicator of the detected interaction in a row of a table of the database, each number being stored in a distinct column.

9. The system of claim 8, wherein the at least one indicator of detected interaction is associated with a display of a page, a simple-click, a double-click, a long press, a quick touch and a long touch.

10. The system of claim 8, wherein the system is further configured to store the pairs associating a chunk with a number in a two-column table of the database.

11. The system of claim 10, wherein the system is further configured to:
search for a chunk in the two-column table of the database to retrieve the corresponding number; and
generate a number and create a new row with the chunk and the generated number when the chunk is absent.

12. A system, comprising:
one or more processors; and
a memory in communication with the one or more processors and storing instructions that, when executed by the one or more processors, are configured to cause the system to:
receive, from a web server a content query comprising at least the URL of the web page on which the interaction has been detected, CSS codes associated with a considered element and at least one indicator of detected interaction as parameters;
split each CSS code into chunks;
encode at least some of the chunks in the form of a number; and
store the resulting sequence of numbers encoding the chunks in a database;
wherein the system is further configured to store the resulting sequence of numbers encoding the chunks comprising the CSS codes associated with the considered element and the at least one indicator of the detected interaction in a row of a table of the database, each number being stored in a distinct column.

13. The system of claim 12, wherein the at least one indicator of detected interaction is associated with a display of a page, a simple-click, a double-click, a long press, a quick touch and a long touch.

14. The system of claim 12, wherein the system is further configured to store the pairs associating a chunk with a number in a two-column table of the database.

15. The system of claim 12, wherein the system is further configured to: search for a chunk in the two-column table of the database to retrieve the corresponding number; and generate a number and create a new row with the chunk and the generated number when the chunk is absent.

16. The system of claim 12, wherein the content query is a silent query.

17. The system of claim 16, wherein the content query is associated with a 1 pixel by 1 pixel sized image.

* * * * *